US010936248B2

(12) United States Patent
Lin et al.

(10) Patent No.: US 10,936,248 B2
(45) Date of Patent: Mar. 2, 2021

(54) DATA WRITING METHOD WITH VERIFYING A PART OF DATA, MEMORY CONTROLLING CIRCUIT UNIT AND MEMORY STORAGE DEVICE

(71) Applicant: PHISON ELECTRONICS CORP., Miaoli (TW)

(72) Inventors: Wei Lin, Taipei (TW); Yu-Cheng Hsu, Yilan County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/452,540

(22) Filed: Jun. 26, 2019

(65) Prior Publication Data
US 2020/0379676 A1 Dec. 3, 2020

(30) Foreign Application Priority Data

May 29, 2019 (TW) .................................. 108118521

(51) Int. Cl.
*G06F 3/06* (2006.01)
*G06F 12/02* (2006.01)

(52) U.S. Cl.
CPC .......... *G06F 3/0659* (2013.01); *G06F 3/0619* (2013.01); *G06F 3/0652* (2013.01); *G06F 3/0679* (2013.01)

(58) Field of Classification Search
CPC .......................... G06F 3/0659; G06F 12/0246
See application file for complete search history.

(56) References Cited

U.S. PATENT DOCUMENTS

| 2015/0178189 | A1* | 6/2015 | Lasser | G06F 11/1008 |
| | | | | 714/6.11 |
| 2015/0324148 | A1* | 11/2015 | Achtenberg | G06F 3/0679 |
| | | | | 711/103 |
| 2016/0357474 | A1* | 12/2016 | Frid | G06F 3/0656 |
| 2017/0255523 | A1* | 9/2017 | Ke | G11C 11/5642 |
| 2017/0317693 | A1* | 11/2017 | Yang | G11C 16/10 |

* cited by examiner

*Primary Examiner* — David E Martinez
(74) *Attorney, Agent, or Firm* — JCIPRNET

(57) ABSTRACT

A data writing method, a memory controlling circuit unit and a memory storage device are provided. The method includes: receiving a plurality of data; writing the plurality of data into a first physical erasing unit by using a multi-page programming mode; and writing at least one first data of the plurality of data into a second physical erasing unit by using a single-page programming mode; verifying the plurality of data stored in the first physical erasing unit; and if the verification fails, performing a writing operation to a third physical erasing unit by using the multi-page programming mode according to the at least one first data and the plurality of data.

21 Claims, 10 Drawing Sheets

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA WRITING METHOD WITH VERIFYING A PART OF DATA, MEMORY CONTROLLING CIRCUIT UNIT AND MEMORY STORAGE DEVICE

CROSS-REFERENCE TO RELATED APPLICATION

This application claims the priority benefit of Taiwan application serial no. 108118521, filed on May 29, 2019. The entirety of the above-mentioned patent application is hereby incorporated by reference herein and made a part of this specification.

BACKGROUND

Technical Field

The invention relates to a data writing method, a memory controlling circuit unit and a memory storage device.

Description of Related Art

Digital cameras, cell phones, and MP3 players have undergone rapid growth in recent years, so that consumers' demands for storage media have also been increased drastically. Due to having the characteristics of non-volatility of data, low power consumption, small volume, non-mechanical structure, and fast reading and writing speed, the rewritable non-volatile memory is the most adaptable memory applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

According to the number of bits which each memory cell thereof is capable of storing, an NAND flash memory may be classified into a Single Level Cell (SLC) NAND flash memory, a Multi Level Cell (MLC) NAND flash memory, or a Trinary Level Cell (TLC) NAND flash memory. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

The memory management circuit can perform write operations to the rewritable non-volatile memory module by using a single page programming mode or a multi-page programming mode. Memory cells programmed by using the single page programming mode are used to store 1 bit of data. Memory cells programmed by using the multi-page programming mode are used to store multiple bits of data.

It is assumed that the memory management circuit presets to write data of a write command to the rewritable non-volatile memory module by using the multi-page programming mode. However, compared to the single page programming mode, the data written by using the multi-page programming mode is less reliable than the data written by using the single page programming mode. In other words, data written by using the multi-page programming mode may occur a write failure causing the written data to have uncorrectable error bits. Therefore, in the conventional method, when the memory management circuit presets to write the data of the write command to the rewritable non-volatile memory module by using the multi-page programming mode, the memory management circuit will also write all data corresponding to the write command to at least one physical erasing unit of the rewritable non-volatile memory module by using the single page programming mode. After that, the memory management circuit verifies all the data corresponding to the write command written by using the multi-page programming mode to determine whether a write failure occurs when performing write operation to a certain (or some) physical programming unit. Suppose a data is written to a physical programming unit by using the multi-page programming mode, when the data stored in the physical programming unit has an error bit that cannot be corrected (i.e., a write failure occurs), memory management circuit may use the data previously written by using the single page programming mode for data recovery. That is to say, in the above example, the single page programming mode is used for data recovery and backup.

It should be noted that the process of backing up data by using the single page programming mode takes time and the space of the rewritable non-volatile memory module. In addition, it also takes a lot of time that the memory management circuit verifies all the data corresponding to the write command written by using the multi-page programming mode to determine whether a write failure occurs during performing write operations to a certain (or some) physical programming unit.

SUMMARY

The present invention provides a data writing method, a memory controlling circuit unit, and a memory storage device, which can reduce the time required for data writing and verification.

The present invention provides a data writing method for a rewritable non-volatile memory module, wherein the rewritable non-volatile memory module includes a plurality of physical erasing units, each of the plurality of physical erasing units includes a plurality of physical programming units. The data writing method comprises: receiving a plurality of data; writing the plurality of data into a first physical erasing unit of the plurality of physical erasing units by using a multi-page programming mode; writing at least one first data of the plurality of data into a second physical erasing unit of the plurality of physical erasing units by using a single page programming mode; verifying the plurality of data stored in the first physical erasing unit; and when the verification fails, performing a writing operation to a third physical erasing unit of the plurality of physical erasing units by using the multi-page programming mode according to the at least one first data and the plurality of data.

The present invention provides a memory controlling circuit unit for a rewritable non-volatile memory module. The memory controlling circuit unit comprises: a host interface, a memory interface and a memory management circuit. The host interface is configured to couple to a host system. The memory interface is configured to couple to the rewritable non-volatile memory module, wherein the rewritable non-volatile memory module includes a plurality of physical erasing units, each of the plurality of physical erasing units includes a plurality of physical programming units. The memory management circuit is coupled to the host interface and the memory interface. The memory management circuit is configured to perform the following operations: receiving a plurality of data; writing the plurality of data into a first physical erasing unit of the plurality of physical erasing units by using a multi-page programming mode; writing at least one first data of the plurality of data into a second physical erasing unit of the plurality of physical erasing units by using a single page programming mode; verifying the plurality of data stored in the first physical erasing unit; and when the verification fails, performing a writing operation to a third physical erasing unit of the plurality of physical erasing units by using the multi-page programming mode according to the at least one first data and the plurality of data.

The present invention provides a memory storage device comprising: a connection interface unit, a rewritable non-volatile memory module and a memory controlling circuit unit. The connection interface unit is configured to couple to a host system. The rewritable non-volatile memory module includes a plurality of physical erasing units, each of the plurality of physical erasing units includes a plurality of physical programming units. The memory controlling circuit unit is coupled to the connection interface unit and the rewritable non-volatile memory module. The memory controlling circuit unit is configured to perform the following operations: receiving a plurality of data; writing the plurality of data into a first physical erasing unit of the plurality of physical erasing units by using a multi-page programming mode; writing at least one first data of the plurality of data into a second physical erasing unit of the plurality of physical erasing units by using a single page programming mode; verifying the plurality of data stored in the first physical erasing unit; and when the verification fails, performing a writing operation to a third physical erasing unit of the plurality of physical erasing units by using the multi-page programming mode according to the at least one first data and the plurality of data.

Accordingly, the data writing method, the memory controlling circuit unit and the memory storage device of the present invention can be used to back up a part of the data when the preset of performing the write operation is the multi-page programming mode. And in the process of verifying the data written by using the multi-page programming mode, only the data in some of the physical programming units needs to be verified, thereby reducing the time required for data writing and verification.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
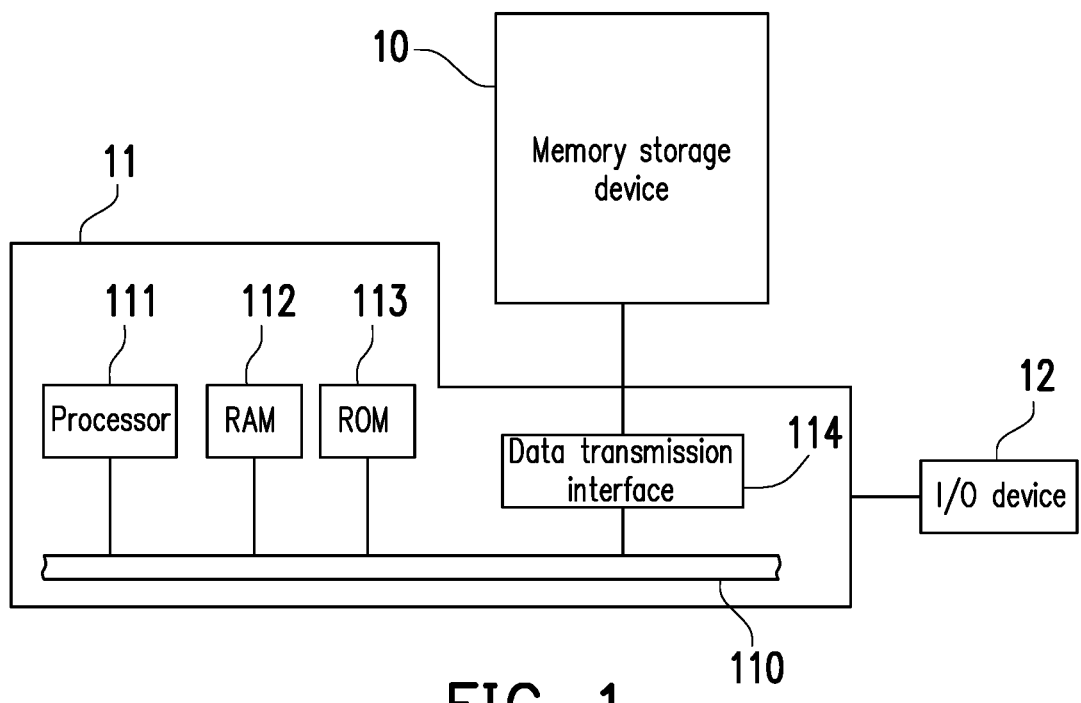
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
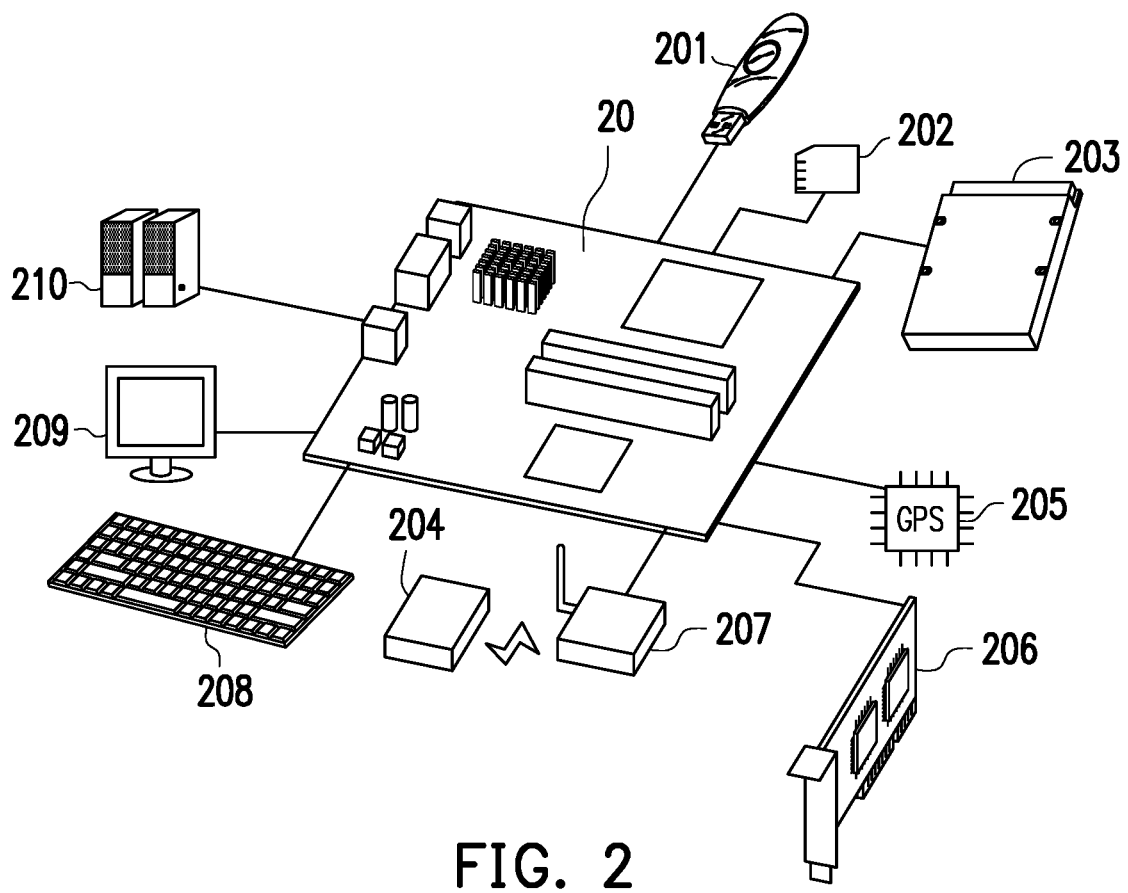
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
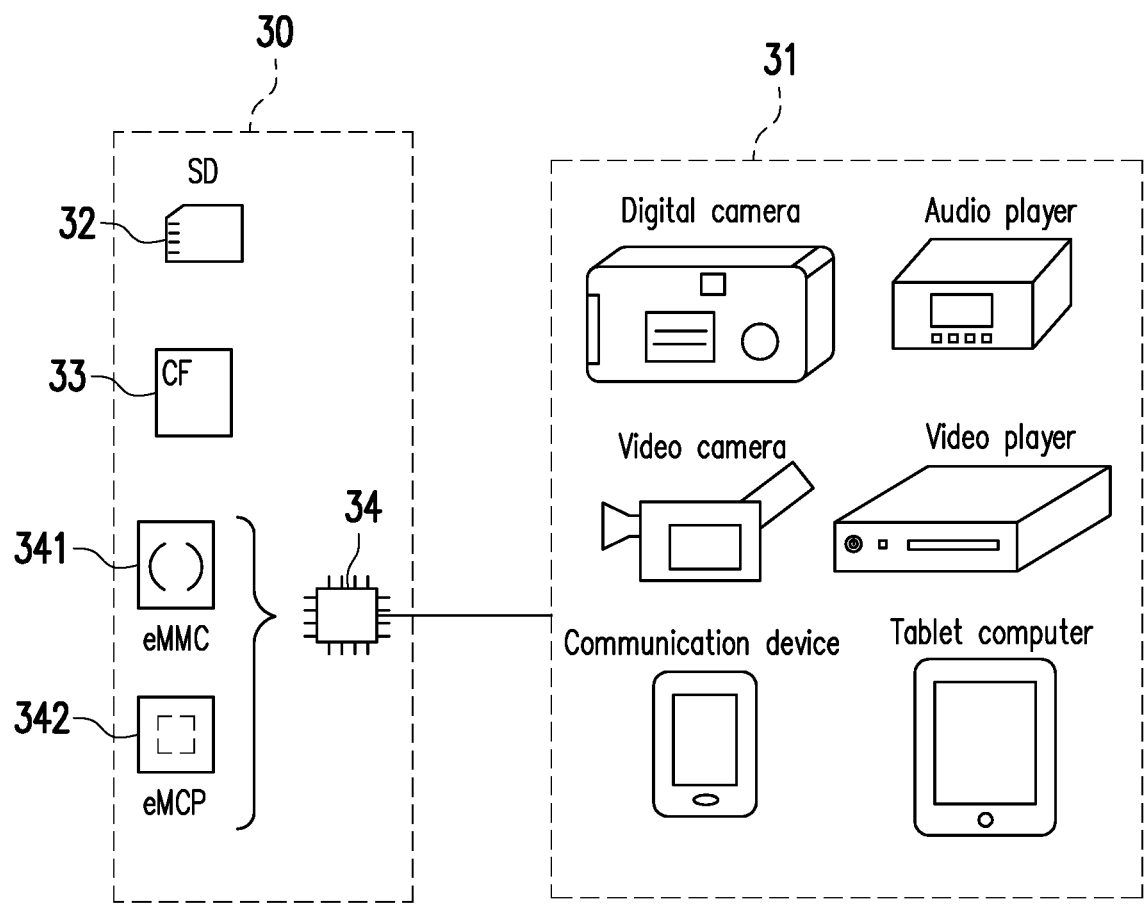
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, and a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
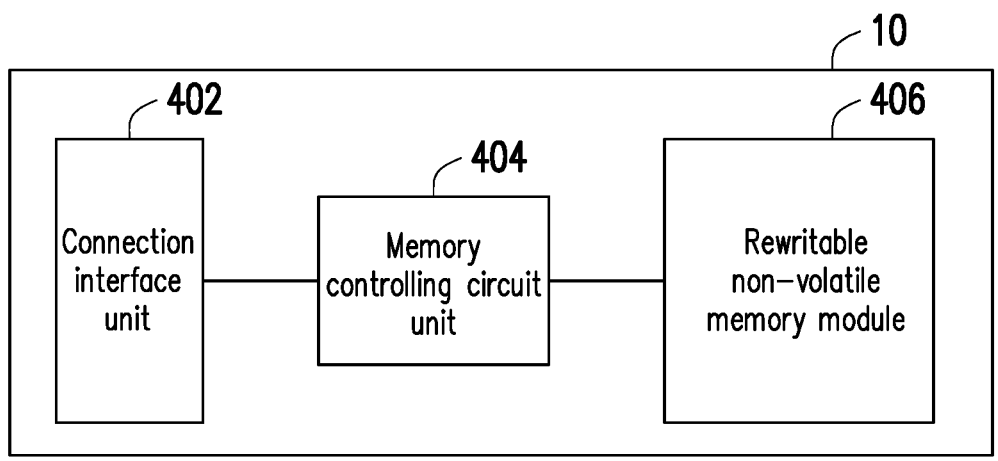
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory controlling circuit unit 404 and a rewritable non-volatile memory module 406.

In this embodiment, the connection interface unit 402 is compatible with a SATA (Serial Advanced Technology Attachment) standard. Nevertheless, it should be understood that the invention is not limited in this regard. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory controlling circuit unit 404 may be packaged into one chip, or the connection interface unit 402 is distributed outside of a chip containing the memory controlling circuit unit 404.

The memory controlling circuit unit 404 is configured to execute a plurality of logic gates or control commands which are implemented in a hardware from or in a firmware from and perform operations of writing, reading or erasing data in the rewritable non-volatile memory module 406 according to the commands of the host system 11.

The rewritable non-volatile memory module 406 is coupled to the memory controlling circuit unit 404 and configured to store data written from the host system 11. The rewritable non-volatile memory module 406 has physical erasing units 510(0) to 510(N). For instance, the physical erasing units 510(0) to 510(N) may belong to the same memory die or belong to different memory dies. Each physical erasing unit has a plurality of physical programming units. For example, in the present exemplary embodiment, each physical erasing unit contains 258 physical programming units, and physical programming units belonging to the same physical erasing unit may be written independently and erased simultaneously. However, it is to be understood that the present invention is not limited thereto, and each physical erasing unit may contain 64 physical programming units, 256 physical programming units or any number of physical programming units.

To be more detailed, a physical erasing unit is the smallest is the smallest unit for erasing data, namely, each physical erasing unit contains the least number of memory cells that are erased all together. A physical programming unit is the smallest unit for programming data, namely, each physical programming unit is the smallest unit for writing data. Each physical programming unit commonly includes a data bit area and a redundant bit area, and the data bit area includes a plurality of physical access addresses for storing data of users, and the redundant bit area is configured for storing system data (e.g., control information and error correcting codes). In the present exemplary embodiment, each data bit area of the physical programming units contains 4 physical access addresses, and the size of each physical access address is 512 bytes. However, in other exemplary embodiments, more or less number of the physical access addresses may be contained in the data bit area, and the amount and the size of the physical access addresses are not limited in the present invention.

In the present exemplary embodiment, the rewritable non-volatile memory module 406 is a trinary-level cell (TLC) NAND flash memory module (i.e., a flash memory module capable of storing data of 3 bits in one memory cell). However, the present invention is not limited thereto, and the rewritable non-volatile memory module 406 may also be a multi-level cell (MLC) NAND flash memory module (i.e., a flash memory module capable of storing data of 2 bits in one memory cell), other flash memory modules, or other memory modules having the same characteristics.

Figures 5A, 5B:
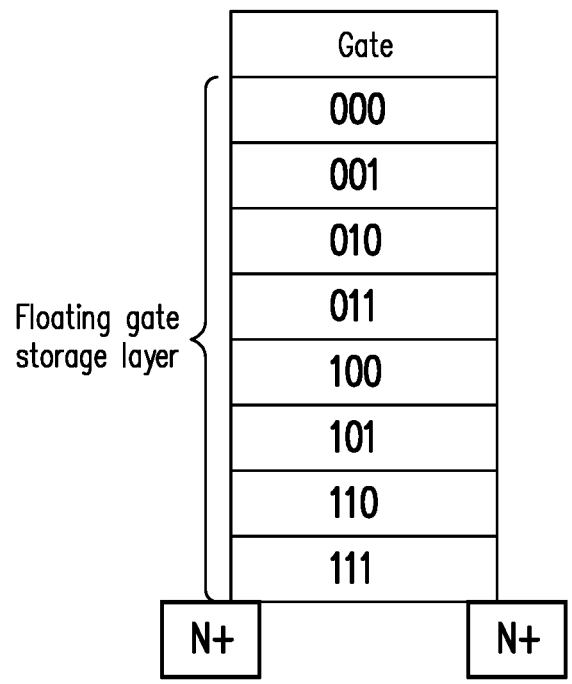
FIG. 5A and FIG. 5B are schematic diagrams illustrating examples of a storage structure of a memory and physical erasing units according to an exemplary embodiment of the present invention.

FIG. 5A and FIG. 5B are schematic diagrams illustrating examples of a storage structure of a memory and physical erasing units according to an exemplary embodiment of the present invention.

With reference to FIG. 5A, a storage state of each memory cell of the rewritable non-volatile memory module 406 can be recognized as "111", "110", "101", "100", "011", "010", "001" or "000" (shown in FIG. 3A), in which a first bit counted from the left is a least significant bit (LSB), a second bit counted from the left is a center significant bit (CSB) and a third bit counted from the left is a most significant bit (MSB). Moreover, a plurality of memory cells arranged on a same word line may from 3 physical programming units, where the physical programming unit formed by the LSBs of the memory cells is referred to as a lower physical programming unit, the physical programming unit formed by the CSBs of the memory cells is referred to as a middle physical programming unit, and the physical programming unit formed by the MSBs of the memory cells is referred to as an upper physical programming unit.

With reference to FIG. 5B, a physical erasing unit is composed of a plurality of physical programming unit groups, where each of the physical programming unit groups includes a lower physical programming unit, a middle physical programming unit and an upper physical programming unit formed by a plurality of memory cells arranged on a same word line. For instance, in the physical erasing unit, a 0th physical programming unit belonging to the lower physical programming unit, a 1st physical programming unit belonging to the middle physical programming units and a 2nd physical programming unit belonging to the upper physical programming unit are regarded as one physical programming unit group. Similarly, the 3rd, 4th and 5th physical programming units are regarded as one physical programming unit group, and deduced by analogy, the other physical programming units are also grouped into a physical programming unit group according to such manner.

Figure 6A:
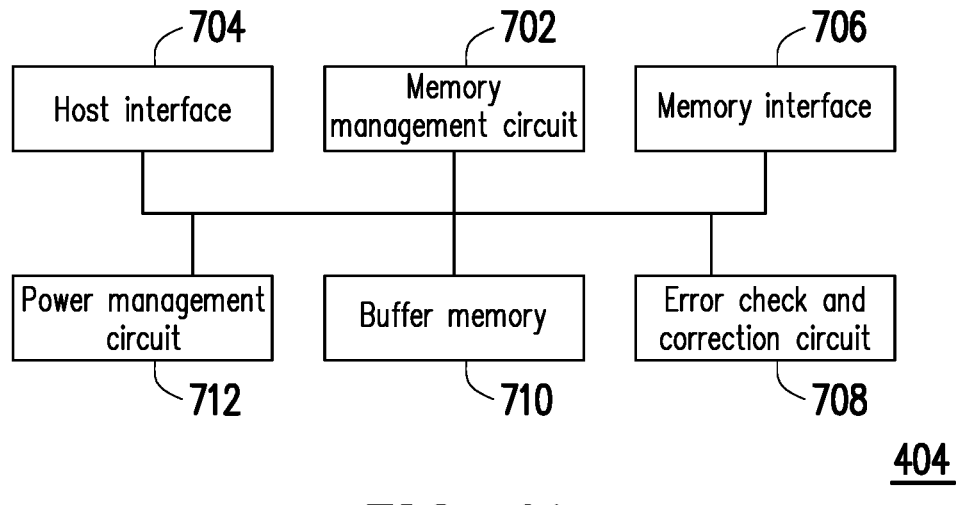
FIG. 6A is a schematic block diagram illustrating a memory controlling circuit unit according to an exemplary embodiment of the invention.

FIG. 6A is a schematic block diagram illustrating a memory controlling circuit unit according to an exemplary embodiment of the invention.

Referring to FIG. 6A, the memory controlling circuit unit 404 includes a memory management circuit 702, a host interface 704, a memory interface 706 and an error check and correction circuit 708.

The memory management circuit 702 is configured to control overall operations of the memory controlling circuit unit 404. Specifically, the memory management circuit 702 has a plurality of control commands. When the memory storage device 10 operates, the control commands are executed to perform various operations such as data writing, data reading and data erasing. Hereinafter, description regarding operations of the memory management circuit 702 or any circuit element in the memory controlling circuit unit 404 is equivalent to description regarding operations of the memory controlling circuit unit 404.

In this exemplary embodiment, the control commands of the memory management circuit 702 are implemented in form of firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, the system area in a memory exclusively used for storing system data) of the rewritable non-volatile memory module 406. In addition, the memory management circuit 702 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 702 when the memory controlling circuit unit 404 is enabled. Then, the control commands are executed by the microprocessor unit to perform operations, such as writing, reading or erasing data.

Further, in another exemplary embodiment, the control commands of the memory management circuit 702 may also be implemented in form of hardware. For example, the memory management circuit 702 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 702 may further give command sequence of other types to the rewritable non-volatile memory module 406 for instructing to perform the corresponding operations.

The host interface 704 is coupled to the memory management circuit 702 and configured to receive and identify commands and data sent from the host system 11. In other words, the commands and data transmitted by the host system 11 are transmitted to the memory management circuit 702 via the host interface 704. In this exemplary embodiment, the host interface 704 is compatible with the SATA standard. Nevertheless, it should be understood that the invention is not limited in this regard. The host interface 704 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 706 is coupled to the memory management circuit 702 and configured to access the rewritable non-volatile memory module 406. In other words, data to be written into the rewritable non-volatile memory module 406 is converted into a format acceptable by the rewritable non-volatile memory module 406 via the memory interface 706. Specifically, if the memory management circuit 702 intends to access the rewritable non-volatile memory module 406, the memory interface 706 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 702 and transmitted to the rewritable non-volatile memory module 406 through the memory interface 706, for example. The command sequences may include one or more signals, or data transmitted in the bus. The signals or the data may include command codes and program codes. For example, information such as identification codes and memory addresses are included in the read command sequence.

The error check and correction circuit 708 is coupled to the memory management circuit 702 and configured to perform an error check and correction operation to ensure integrity of data. Specifically, when the memory management circuit 702 receives the write command from the host system 11, the error check and correction circuit 708 generates an ECC (error correcting code) and/or an EDC (error detecting code) for data corresponding to the write command, and the memory management circuit 702 writes data and the ECC and/or the EDC corresponding to the write command into the rewritable non-volatile memory module 406. Later, when reading the data from the rewritable non-volatile memory module 406, the memory management circuit 702 will read the corresponding ECC and/or the EDC, and the error check and correction circuit 708 will perform the error check and correction operation on the read data based on the ECC and/or the EDC.

In an exemplary embodiment, the memory controlling circuit unit 404 further includes a buffer memory 710 and a power management circuit 712.

The buffer memory 710 is coupled to the memory management circuit 702 and configured to temporarily store data and commands from the host system 11 or data from the rewritable non-volatile memory module 406. The power management unit 712 is coupled to the memory management circuit 702 and configured to control a power of the memory storage device 10.

In this exemplary embodiment, the error check and correction circuit 708 can perform a single-frame encoding for the data stored in the same physical programming unit and can also perform a multi-frame encoding for data stored in multiple physical programming units. Each of the single-frame encoding and the multi-frame encoding may adopt encoding algorithms including at least one of a LDPC (low density parity code), a BCH code, a convolutional code or a turbo code. Alternatively, in another exemplary embodiment, the multi-frame encoding may also include a RS codes (Reed-solomon codes) algorithm or an XOR (exclusive OR) algorithm. Further, in another exemplary embodiment, more of other encoding algorithms not listed above may also be adopted, which are omitted herein. According to the adopted encoding algorithm, the error check and correction circuit 708 can encode the data to be protected, so as to generate the corresponding ECC and/or the EDC. For descriptive convenience, the ECC and/or the EDC generated by encoding are collectively referred to as encoded data.

It is noted that in the following description, some terms may be replaced with corresponding abbreviations for ease of reading (see Table 1).

TABLE 1

| rewritable non-volatile memory module | RNVM module |
|---|---|
| physical programming unit | PPU |
| physical erasing unit | PEU |
| memory management circuit | MMC |
| memory storage device | MSD |
| single page programming | SPP |
| multi-page programming | MPP |

Figure 6B:
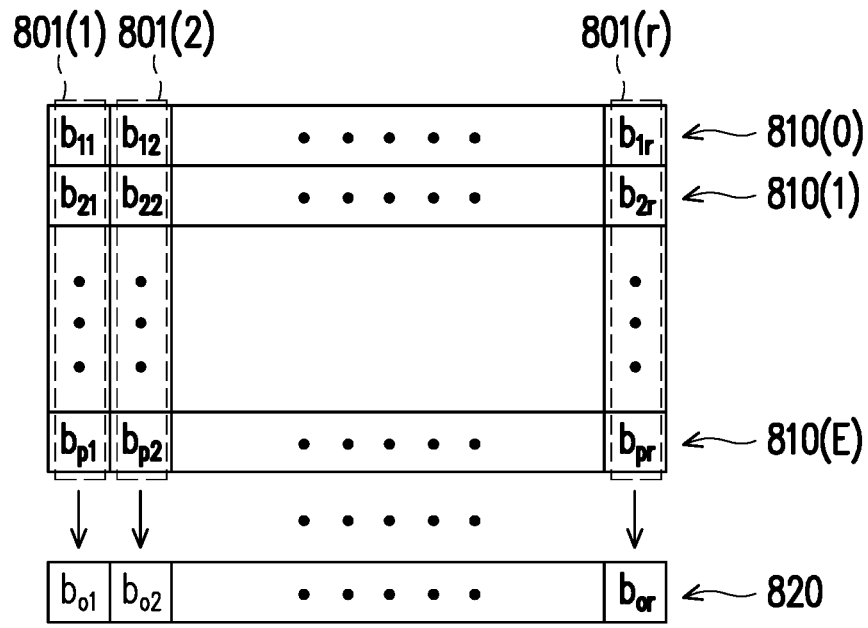
FIG. 6B is a schematic diagram illustrating a multi-frame encoding according to an exemplary embodiment of the invention.

FIG. 6B is a schematic diagram illustrating a multi-frame encoding according to an exemplary embodiment of the invention.

With reference to FIG. 6B that takes encoded data 820 correspondingly generated by encoding the data stored in PPUs 810(0) to 810(E) as an example, in which at least a part of data stored by each of the PPUs 810(0) to 810(E) may be regarded as one frame. In the multi-frame encoding, the data in the PPUs 810(0) to 810(E) are encoded based on each of positions where bits (or bytes) are located. For example, bits $b_{11}, b_{21}, \ldots, b_{p1}$ at a position 801(1) are encoded as a bit $b_{o1}$ in the encoded data 820 and bits $b_{12}, b_{22}, \ldots, b_{p2}$ at a position 801(2) are encoded as a bit $b_{o2}$ in the encoded data 820; and by analogy, bits $b_{1r}, b_{2r}, \ldots, b_{pr}$ at a position 801(r) are encoded as a bit $b_{or}$ in the encoded data 820. Later, the data read from the PPUs 810(0) to 810(E) may be decoded according to the encoded data 820 so attempts on correcting possible errors in the read data can be made.

Herein, in another exemplary embodiment of FIG. 6B, the data used for generating the encoded data 820 may also include redundancy bits corresponding to the data bits of the data stored in the PPUs 810(0) to 810(E). Taking the data stored in the PPU 810(0) for example, the redundancy bits therein are, for example, generated by performing the single-frame encoding for the data bits stored in the PPU 810(0). In this exemplary embodiment, it is assumed that when the data of the PPU 810(0) is read, the data read from the PPU 810(0) may be decoded by the redundancy bits (e.g., the encoded data of the single-frame encoding) in the PPU 810(0) so as to perform the error check and correct operation. However, if a failure occurs when a decoding operation is performed by using the redundancy bits in the PPU 810(0) (e.g., a number of error bits of the data stored in the PPU 810(0) is greater than a threshold), a retry-read mechanism may be used to attempt reading correct data from the PPU 810(0). Details regarding the retry-read mechanism would be described later. When the correct data cannot be read from the PPU 810(0) by using the retry-read mechanism, the encoded data 820 and data of the PPUs 810(1) to 810(E) may be read and the decoding may be performed according to the encoded data 820 and the data of the PPUs 810(1) to 810(E) so as to attempt correcting errors included in the data stored in the PPU 810(0). In other words, in the present exemplary embodiment, if a failure occurs when the decoding is performed by using the encoded data generated by the single-frame encoding and a failure occurs when the reading is performed by using the retry-read mechanism, the encoded data generated by the multi-frame encoding is used for the decoding instead.

Figure 7:
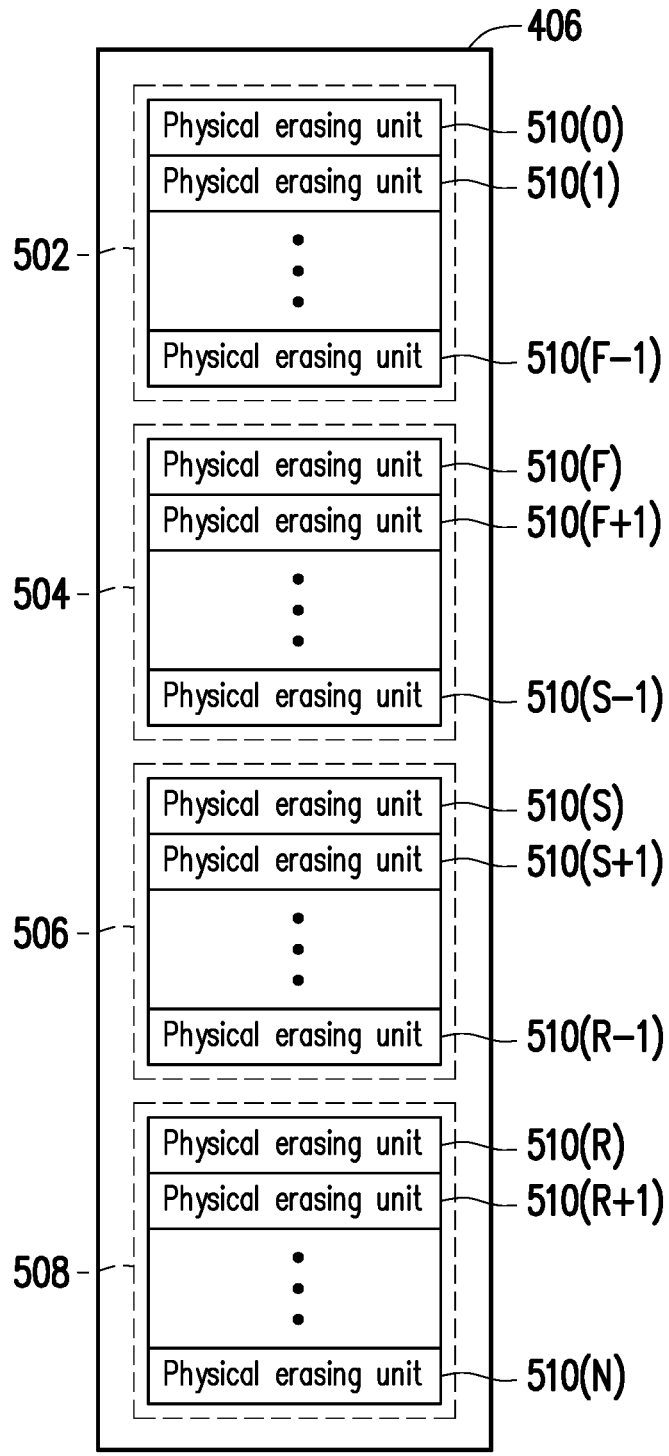
FIG. 7 and FIG. 8 are schematic diagrams illustrating examples of managing the PEUs according to an exemplary embodiment of the present invention.
Figure 8:
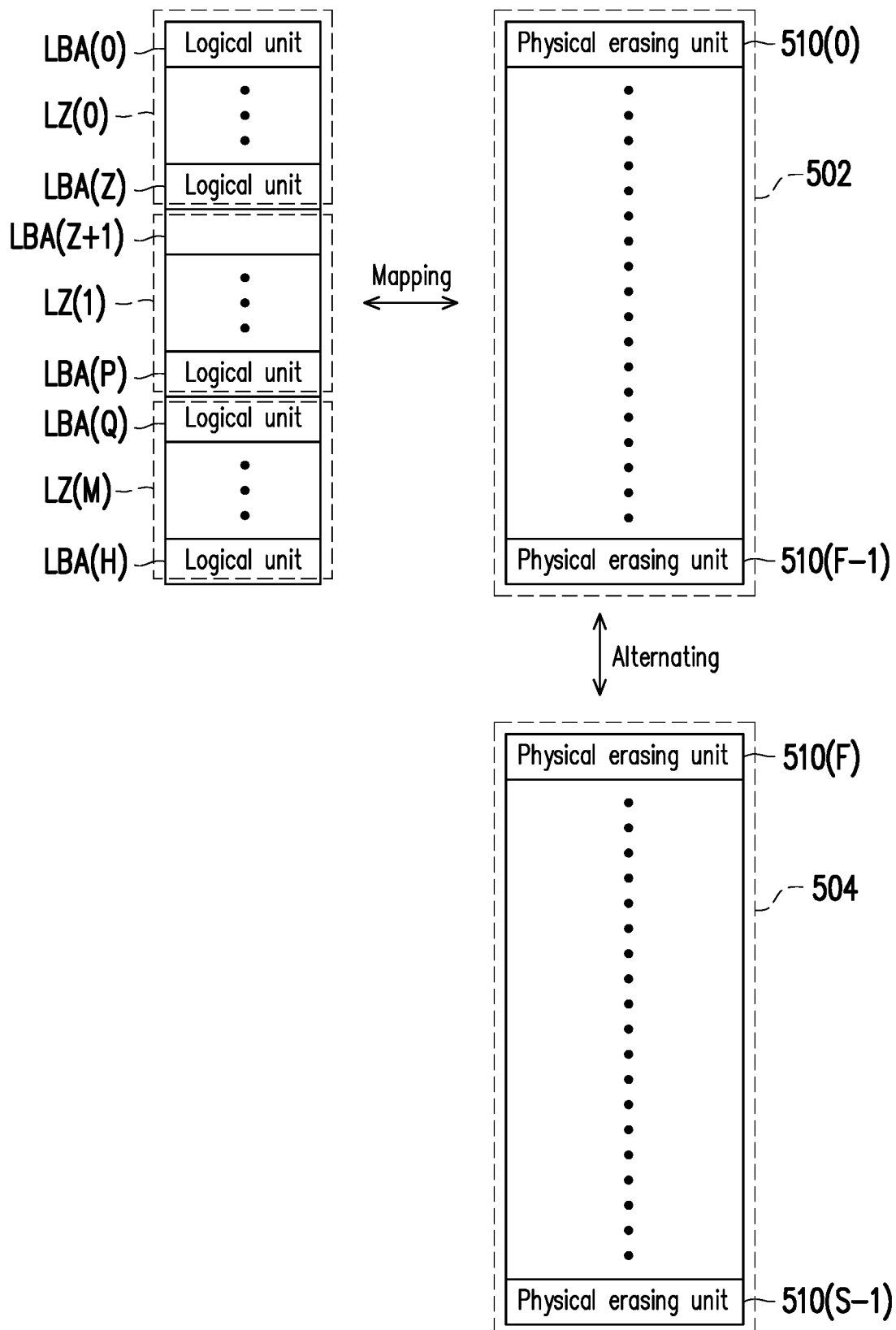

FIG. 7 and FIG. 8 are schematic diagrams illustrating examples of managing the PEUs according to an exemplary embodiment of the present invention.

With reference to FIG. 7, the RNVM module 406 has PEUs 510(0) to 510(N), and the MMC 702 logically partitions the PEUs 510(0) to 510(N) into a data area 502, a free area 504, a temporary area 506 and a replacement area 508.

The PEUs logically belonging to the data area 502 and the free area 504 are used for storing data from the host system 11. To be more specific, the PEUs belonging to the data area 502 are regarded as PEUs with data stored therein, and the PEUs belonging to the free area 504 are PEUs in replacement with the data area 502. Namely, when the host system 11 receives a write command and data to be written, the MMC 702 selects a PEU from the free area 504 and writes the data into the selected PEU so as to replace the PEU of the data area 502.

The PEUs logically belonging to the temporary area 506 are used for recording system data. For instance, the system data includes a logical address-physical address mapping table, the manufacturers and models of the RNVM module, the number of physical blocks in the RNVM modules, the number of PPUs of each PEU.

The PEUs logically belonging to the replacement area 508 are used for replacing damaged PEUs. To be more specific, if there are still normal PEUs is the replacement area 508, and a PEU in the data area 502 is damaged, the MMC 302 elects a normal PEU from the replacement area 508 to replace the damaged PEU.

Specially, the number of the PEUs belonging to the data area 502, the free area 504, the temporary area 506 and the replacement area 508 vary with different memory types. Additionally, it is to be understood that in the operation of the MSD 10, the PEUs associated with the data area 502, the free area 504, the temporary area 506 and the replacement area 508 are dynamically changed. For instance, when one PEU in the free area 504 is damaged and replaced by a PEU of the replacement area 508, the PEUs originally associated with the replacement area 508 is associated with the free area 504.

With reference to FIG. 8, the MMC 702 configures logical units LBA(0) to LBA(H) for mapping the PEUs belonging to the data area 502, where each logical unit has a plurality of logical sub-units to be mapped to the PPUs of the corresponding PEU. In the meantime, when the host system 11 is to write data into a logical unit or update the data stored in the logical unit, the MMC 702 selects a PEU from the free area 504 for writing data to alternatively replace the PEU of the data area 502. In the present exemplary embodiment, a logical sub-unit may be a logical page or a logical sector.

In order to identify where each logical unit of data is stored in the PEU, in the present exemplary embodiment, the MMC 702 records mapping relations between the logical units and the PEUs. When the host system 11 is about to access data in the logical sub-unit, the MMC 702 confirms the logical unit where the logical sub-units belong to and accesses data from the PEU mapped to the logical unit. For instance, in the present exemplary embodiment, the MMC 702 stores a logical address-physical address mapping table in the RNVM module 406 for recording each PEU mapped to the logical unit. When accessing data, the MMC 702 loads the logical address-physical address mapping table o the buffer memory 710 for updating.

It should be mentioned that the buffer memory 710 may be incapable of recording mapping tables recording the mapping relations of all logical units due to its limited capacity. Therefore, in the present exemplary embodiment, the MMC 702 groups the logical units LBA(0) to LBA(H) into a plurality of logical zones LZ(0) to LZ(M) and assigns one logical address mapping table to each logical zone. Specially, when the MMC 702 is going to update the mapping of a logical unit, the logical address-physical address mapping table corresponding to the logical zone of the logical unit is loaded to the buffer memory buffer memory 710 and is then updated.

It should be noted that the MMC 702 may perform write operations to the RNVM module 406 by using the SPP mode or the MPP mode.

Figure 9:
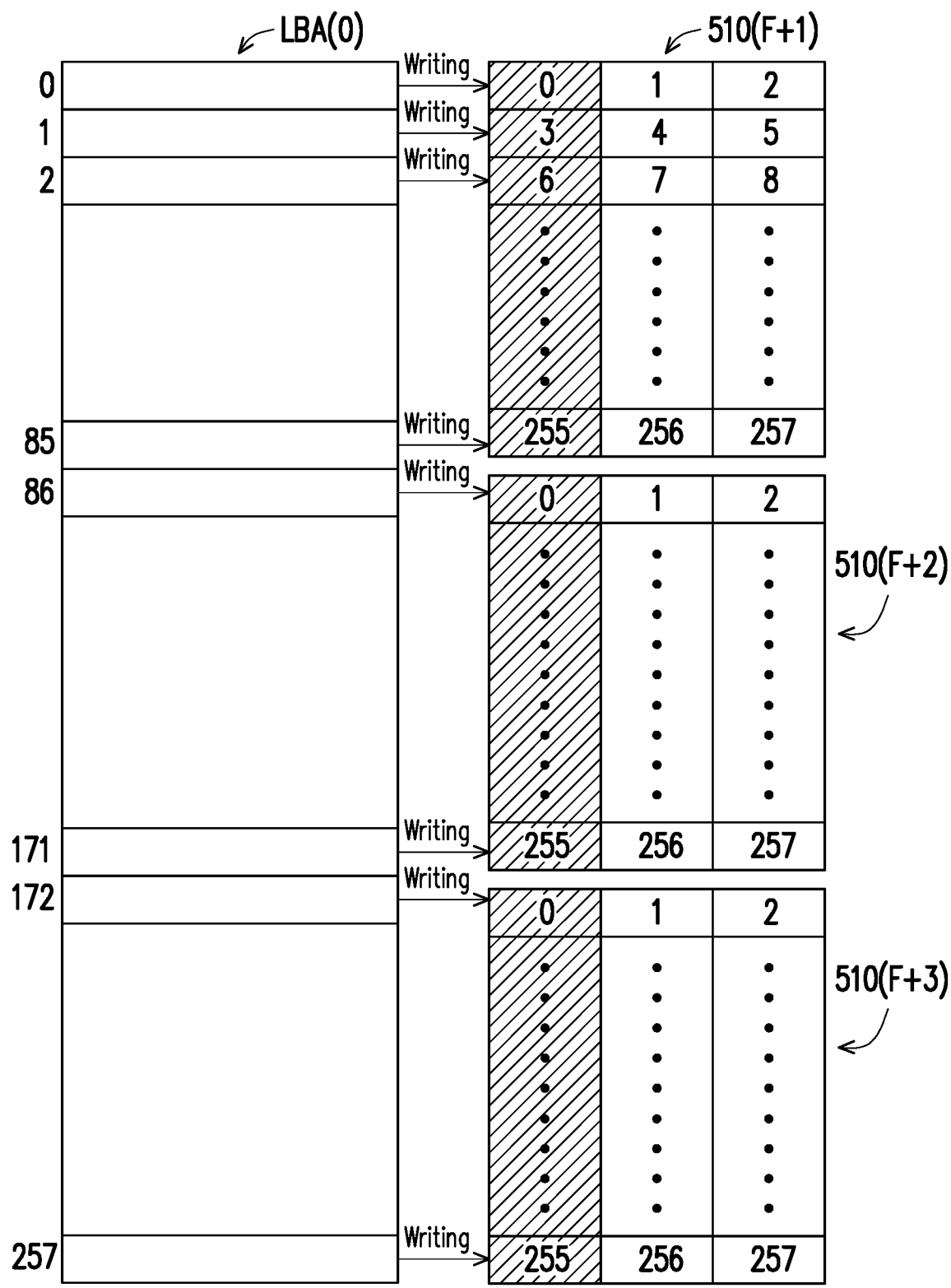
FIG. 9 is a schematic diagram of writing data into the rewritable non-volatile memory module by using the single page programming mode according to an exemplary embodiment of the invention.

FIG. 9 is a schematic diagram of writing data into the RNVM module by using the SPP mode according to an exemplary embodiment of the invention.

Referring to FIG. 9, when the MSD 10 receives a write command (a.k.a, first write command) indicating that storing the update data to the 0th to 257th logical sub-units of the logical unit LBA(0) from the host system 11. It is assumed that in the present exemplary embodiment, the MMC 702 extracts three PEUs 510(F+1), 510(F+2), and 510(F+3) from the free area 504 as a plurality of active PEUs corresponding to the first write command. Assuming that the MMC 702 performs write operations by using the SPP mode, the MMC 702 writes the data of the first write command from the buffer memory 710 to the PPUs of the PEUs 510 (F+1), 510 (F+2), and 510 (F+3) according to a first instruction sequence. Here, since the PPUs of the PEUs 510(F+1), 510(F+2), and 510(F+3) are programmed by using the SPP mode, as described above, the memory cells constituting the PPU of the PEUs 510(F+1), 510(F+2), and 510(F+3) are programmed to store 1 bit of data. That is, in the SPP mode, data is written into the lower PPUs of the PEUs 510(F+1), 510(F+2), and 510(F+3) and data is not written into the middle PPU and the upper PPU of the PEUs 510(F+1), 510(F+2), and 510(F+3).

In detail, as shown in FIG. 9, the MMC 702 sequentially writes the data to be stored into the 0th to 257th logical sub-units of the logical unit LBA(0) to the lower PPUs of the PEUs 510(F+1), 510(F+2), and 510 (F+3). That is, the MMC 702 writes the data corresponding to the first write command from the buffer memory 710 to the lower PPUs of the PEUs 510 (F+1), 510 (F+2), and 510 (F+3) of the RNVM module 406 by using the SPP mode. The middle PPUs and upper PPUs of the PEUs 510(F+1), 510(F+2) and 510(F+3) will not be used to store data.

After writing the data corresponding to the first write command from the buffer memory 710 to the lower PPUs of units 510(F+1), 510(F+2), and 510 (F+3) in the RNVM module 406 by using the SPP mode, the MMC 702 will associate the PEUs 510(F+1), 510(F+2) and 510(F+3) to the data area 502, and reply a write completion message to the host system 11 in response to the first write command issued by the host system 11.

Figure 10:
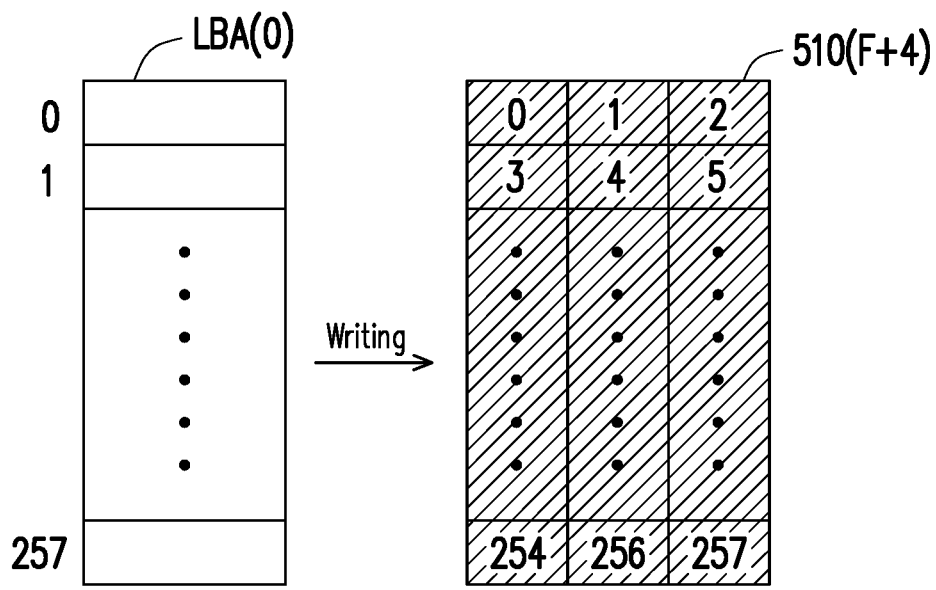
FIG. 10 is a schematic diagram of writing data into the rewritable non-volatile memory module by using the multi-page programming mode according to an exemplary embodiment of the present invention.

FIG. 10 is a schematic diagram of writing data into the RNVM module by using the MPP mode according to an exemplary embodiment of the present invention. Assuming that the first write command is used to instruct that storing the data into the 0th to 257th logical sub-units of the logic unit LBA(0), the MMC 702 first temporarily stores the data of the first write command to the buffer memory 710. After that, referring to FIG. 10, the MMC 702 can extract, for example, one PEU 510(F+4) from the free area 504 as an active PEU corresponding to the first write command. Assuming that the MMC 702 performs write operations by using the MPP mode, the MMC 702 writes the data of the first write command from the buffer memory 710 to the PPUs of the PEU 510(F+4) according to a first instruction sequence. Here, since the PEU 510(F+4) is programmed by using the MPP mode, as described above, the memory cells constituting the PPUs of the PEU 510(F+4) is programmed to store multiple bits of data. That is to say, in the MPP mode, the lower PPUs, the middle PPUs and the upper PPUs of the PEU 510(F+4) are used to store data.

In detail, as shown in FIG. 10, the MMC 702 sequentially writes the data to be stored into the 0th to 257th logical sub-units of the logical unit LBA(0) to the lower PPUs, the middle PPUs and the upper PPUs of the PEU 510(F+4). That is, the MMC 702 writes the data corresponding to the first write command from the buffer memory 710 to the lower PPUs, the middle PPUs and the upper PPUs of the PEU 510(F+4) of the RNVM module 406 by using the MPP mode.

After writing the data corresponding to the first write command from the buffer memory 710 to the lower PPUs, the middle PPUs and the upper PPUs of the PEU 510(F+4) of the RNVM module 406 by using the MPP mode, the MMC 702 will associate the PEU 510 (F+4) to the data area. 502, and replying a write completion message to the host system 11 in response to the first write command issued by the host system 11.

It should be noted that, in an embodiment, it is assumed that the MMC 702 presets to write the data of a write command to the RNVM module 406 by using the MPP mode. However, the data written by using the MPP mode is less reliable than the data written by using the SPP mode. In other words, data written by using the MPP mode may occur a write failure causing the written data to have uncorrectable error bits. Therefore, in the conventional method, when the MMC 702 presets to write the data of the write command to the RNVM module 406 by using the MPP mode, the MMC 702 will also write all data corresponding to the write command to at least one PEU of the RNVM module 406 by using the SPP mode. After that, the MMC 702 verifies all the data corresponding to the write command written by using the MPP mode to determine whether a write failure occurs when performing write operation to a certain (or some) PPU. Suppose a data is written to a PPU by using the MPP mode, when the data stored in the PPU has an error bit that cannot be corrected (i.e., a write failure occurs), MMC 702 may use the data previously written by using the SPP mode for data recovery. That is to say, in the above example, the SPP mode is used for data recovery and backup.

It should be noted that the process of backing up data by using the single page programming mode takes time and the space of the RNVM module 406. In addition, it also takes a lot of time that the MMC 702 verifies all the data corresponding to the write command written by using the MPP mode to determine whether a write failure occurs during performing write operations to a certain (or some) PPU.

Therefore, the present invention provides a data writing method. When the MMC 702 presets to perform write operation by using the MPP mode, the MMC 702 only needs to back up a part of the data, and only needs to verify the data in some of the PPUs in the process of verifying the data written by using the MPP mode. Thereby, the time required for writing and verification is reduced.

Figure 11:
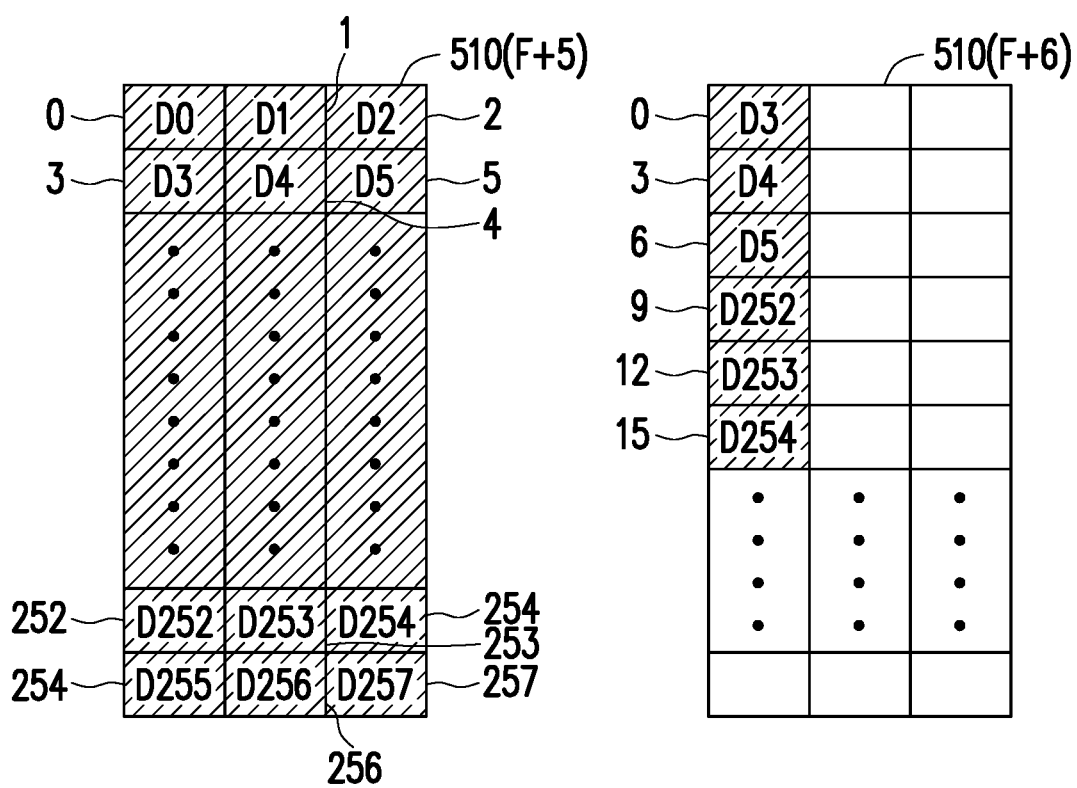
FIGS. 11 to 12 are schematic diagrams illustrating an example of a data writing method according to an exemplary embodiment of the invention.
Figure 12:
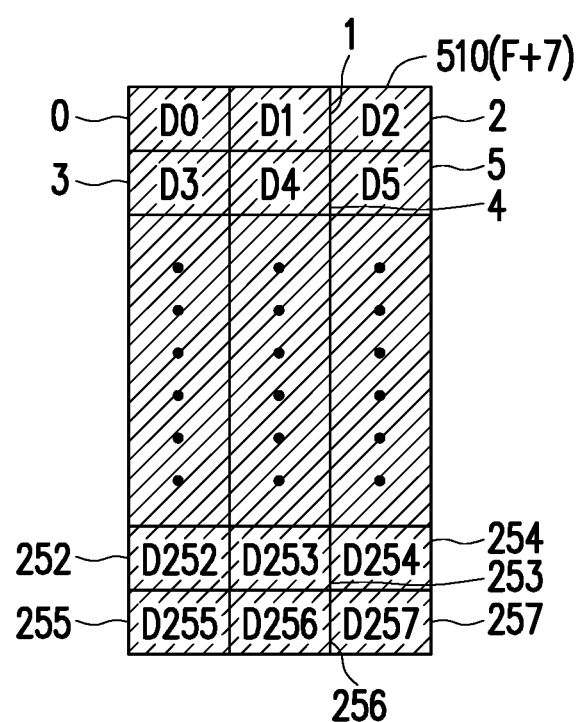

In more detail, FIGS. 11 to 12 are schematic diagrams illustrating an example of a data writing method according to an exemplary embodiment of the invention.

It is assumed that the MMC 702 receives at least one write command issued by the host system 11. The write command is used for instructing to write multiple data (for example, data D0~D257) into the rewritable non-volatile memory 406. The MMC 702 would receive the data D0~D257 corresponding to the write command. The MMC 702 first temporarily stores the data D0~D257 into the buffer memory 710. After that, referring to FIG. 11, the MMC 702 can extract, for example, a PEU 510 (F+5) from the free area 504 as an active PEU corresponding to the above-mentioned write command. Assuming that the MMC 702 presets to perform write operations by using the MPP mode, the MMC 702 writes the data D0~D257 from the buffer memory 710 to the 0th~257th PPUs of the PEU 510(F+5). In detail, as shown in FIG. 11, the MMC 702 sequentially writes the data D0~D255 to the lower physical programming units, the middle PPUs and the upper programming units of the PEU 510(F+5).

In particular, in the embodiment of the present invention, the MMC 702 can store, for example, a lookup table in advance to know which word line (on which disposed with memory cells constituting a PPU) of the RNVM module 406 has a higher probability of occurring the write failure (for example, the probability of occurring the write failure is higher than other PPUs). In more detail, due to the reason of the process, the PPU composed of memory cells on some word lines has a high probability of occurring the writing failure, and the manufacturer of the RNVM module 406 can experimentally know the location of the word lines (or PPUs) that are prone to occur the write failure before the RNVM module 406 leaves the factory, and further generates the lookup table described above Here, the PPU that has a probability of occurring the write failure higher than the aforementioned threshold is called "first entity programming unit". Assuming that the RNVM module 406 includes a total of n word lines, the n word lines are arranged in an order, and a plurality of memory cells on a same word line among the n word lines form one of the plurality of PPUs. Assuming that a plurality of memory cells (also referred to as first memory cells) in the RNVM module 406 form the first PPU, the first memory cells are located on at least one word line (also referred to as a first word line) of the aforementioned n word lines, where n is a positive integer greater than zero. In particular, in an embodiment, the first word line is located at the 0th to i-th word line, the j-th to k-th word lines, or the h-th to (n−1)th word lines of the aforementioned n word lines, wherein i, j, k, h are positive integers greater than zero respectively and are mutually discontinuous with each other. Further, i is less than j, j is less than k, k is less than h, and h is less than n.

For example, it is assumed that the RNVM module 406 includes a total of 96 word lines, and the aforementioned first word line will be located at the 0th~6th word lines, 46th~49th word lines or 89th~95th word lines of the aforementioned 96 word lines. That is, in the present embodiment, the value of i is 6, the value of j is 46, the value of k is 49, the value of h is 89, and the value of n is 96. In other words, in the present embodiment, the probability of occurring the write failure of the plurality of word lines located at the beginning of the n word lines, the plurality of word lines located in the middle of the n word lines, and the plurality of word lines located at the tail of the n word lines is greater than the aforementioned threshold.

Following the example of FIG. 11, the MMC 702 sequentially writes the data D0~D257 to the lower PPUs, the middle PPUs, and the upper PPUs of the PEU 510(F+5). It is assumed that the MMC 702 can know that the 3rd to 5th, 252th to 254th PPUs of the PEU 510(F+5) belong to the first PPUs (i.e., the probability of occurring the write failure is higher than other PPUs) according to the foregoing lookup table. The MMC 702 extracts one PEU 510(F+6) from the free area 504, and writes the data D3~D5, D252~D254 (also referred to as the first data) from the aforementioned buffer memory 710 to the 0th, 3rd, 6th, 9th, 12th, and 15th PPUs (also referred to as a second PPU) of the PEU 510(F+6) by using the SPP mode. It should be noted that the present invention is not used to limit the number of first data. In an embodiment, the number of the first data may be thirty percent of the plurality of data corresponding to the write command received from the host system 11.

Then, the MMC 702 verifies the data stored in the 3rd~5th, 252th~254th PPUs of the PEU 510(F+5) to determine whether there is any uncorrectable bit in the aforementioned data.

If the data stored in the 3rd~5th, 252th~254th PPUs of the PEU 510(F+5) does not have an uncorrectable error bit, the MMC 702 will mark the 0th, 3rd, 6th, 9th, 12th, and 15th programming units of PEU 510(F+6) as invalid.

It is assumed that in the data stored in the 3rd~5th and 252th~254th PPUs of the PEU 510(F+5), when there is an uncorrectable error bit in the data D3~D5 (also referred to as the second data) in the 3rd~5th PPU of the PEU 510(F+5), please refer to FIGS. 11 and 12 at the same time, in an embodiment, the MMC 702 copies the data D3~D5 from the 0th, 3rd, and 6th PPUs of the PEU 510(F+6), and copies data D0~D2 and data D6~D257 from the 0th~2nd, 6th~257th PPUs of the PEU 510(F+5). After that, the MMC 702 sequentially writes the data D0~D2 copied from the 0~2th PPUs of the PEU 510 (F+5), the data D3~D5 copied from the 0th, 3rd, and 6th PPUs of the PEU 510(F+6) and the data D6~D257 copied from the 6th to 257th PPUs of the PEU 510(F+5) into the 0th to 257th PPUs of the PEU 510(F+7) (also referred to as the third PEU) by using the MPP mode.

In addition, it is assumed that in the data stored in the 3rd~5th and 252th~254th PPUs of the PEU 510(F+5), when there is an uncorrectable error bit in the data D3~D5 in the 3rd~5th PPU of the PEU 510(F+5), please refer to FIGS. 11 and 12 at the same time, in another embodiment, the MMC 702 may also copy the data D3~D5 and D252~D254 from the 0th, 3rd, 6th, 9th, 12th and 15th PPUs of the PEU 510(F+6), and copy data D0~D2, data D6~D251 and data D255~D257 from the 0th~2nd, 6th~251th, 255th~257th PPUs of the PEU 510(F+5). After that, the MMC 702 sequentially writes the data D0~D2 copied from the 0th~2th PPUs of the PEU 510 (F+5), the data D3~D5 copied from the 0th, 3rd, and 6th PPUs of the PEU 510(F+6), the data D6~D251 copied from the 6th~251th PPUs of the PEU 510(F+5), the data D252~D254 copied from the 9th, 12th and 15th PPUs of the PEU 510(F+6) and the data D255~D257 copied from the 255th~257th PPUs of the PEU 510(F+5) into the 0th to 257th PPUs of the PEU 510(F+7) by using the MPP mode.

It should be noted that the foregoing example takes Trinary Level Cell (TLC) NAND type flash memory module (ie, a flash memory module in which a memory cell can store 3 bits of data) as an example. However, the present invention is not limited thereto. In other embodiments, the data writing method of the present invention can also be applied to a multi-level cell (MLC) NAND type flash memory module, a Quad-level cells (QLC) NAND flash memory modules, or other memory modules with the same characteristics FIG. 13 is a flowchart of a data writing method according to an example of the present invention.

Figure 13:
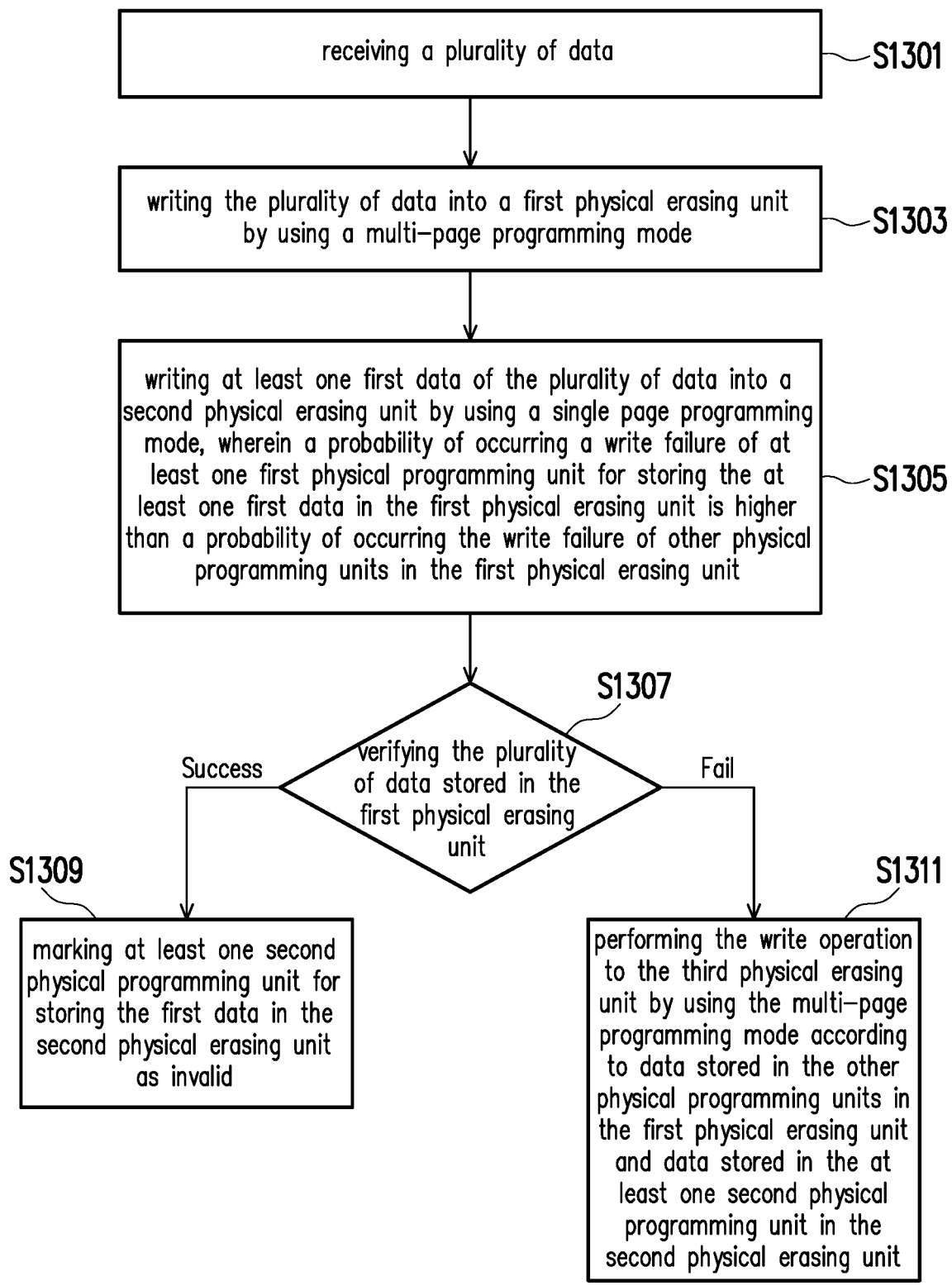
FIG. 13 is a flowchart of a data writing method according to an example of the present invention.

Referring to FIG. 13, in step S1301, the MMC 702 receives a plurality of data. In step S1303, the MMC 702 writes the plurality of data into a first PEU by using a MPP mode. In step S1305, the MMC 702 writes at least one first data of the plurality of data into a second PEU by using the SPP mode, wherein a probability of occurring the write failure of at least one first PPU for storing the at least one first data in the first PEU is higher than a probability of occurring the write failure of other PPUs in the first PEU. Thereafter, in step S1307, the MMC 702 verifies the plurality of data stored in the first PEU. When the verification is successful, in step S1309, the MMC 702 marks the at least one second PPU for storing the first data in the second PEU as invalid. When the verification fails, in step S1311, the MMC 702 performs the write operation to the third PEU by using the MPP mode according to data stored in the other PPUs in the first PEU and data stored in the at least one second PPU in the second PEU.

In summary, the data writing method, the memory controlling circuit unit and the MSD of the present invention can be used to back up a part of the data when the preset of performing the write operation is the MPP mode. And in the process of verifying the data written by using the MPP mode, only the data in some of the PPUs needs to be verified, thereby reducing the time required for data writing and verification.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data writing method for a rewritable non-volatile memory module, wherein the rewritable non-volatile memory module includes a plurality of physical erasing units, each of the plurality of physical erasing units includes a plurality of physical programming units, the data writing method comprising:
    receiving a plurality of data;
    writing the plurality of data into a first physical erasing unit of the plurality of physical erasing units by using a multi-page programming mode;
    only writing at least one first data among the plurality of data into a second physical erasing unit of the plurality of physical erasing units by using a single page programming mode, wherein the at least one first data is a part of the plurality of data;
    only verifying the at least one first data stored in the first physical erasing unit; and
    if the verification fails, performing a writing operation to a third physical erasing unit of the plurality of physical erasing units by using the multi-page programming mode according to the at least one first data and the plurality of data.

2. The data writing method of claim 1, wherein
    a probability of occurring a write failure of at least one first physical programming unit for storing the at least one first data in the first physical erasing unit is higher than a probability of occurring the write failure of other physical programming units in the first physical erasing unit.

3. The data writing method of claim 2, further comprising:
    verifying data stored in the at least one first physical programming unit;
    if there is no uncorrectable bit in the data stored in the at least one first physical programming unit, marking at least one second physical programming unit for storing the first data in the second physical erasing unit as invalid; and
    if there is an uncorrectable bit in a second data stored in the at least one first physical programming unit, performing the write operation to the third physical erasing unit by using the multi-page programming mode according to data stored in the other physical programming units in the first physical erasing unit and data stored in the at least one second physical programming unit in the second physical erasing unit.

4. The data writing method of claim 1, wherein the number of the at least one first data is thirty percent of the number of the plurality of data.

5. The data writing method of claim 2, wherein the rewritable non-volatile memory module comprises n word lines, the n word lines are arranged in an order, a plurality of memory cells on a same word line among the n word lines form one of the plurality of physical programming units, wherein a plurality of first memory cells of the plurality of memory cells form the first physical programming unit, the plurality of first memory cells are located on at least one first word line of the n word lines, and n is a positive integer greater than zero.

6. The data writing method of claim 5, wherein the at least one first word line is located at 0th to i-th word lines, j-th to k-th word lines or h-th to (n−1)th word lines of the n word lines, wherein i, j, k, and h are positive integers greater than zero respectively and are mutually discontinuous, wherein i is less than j, j is less than k, k is less than h, and h is less than n.

7. The data writing method of claim 1, wherein the step of receiving the plurality of data comprises:

receiving at least one write command issued by a host system, wherein the write command is used to instruct a memory management circuit to write the plurality of data into the rewritable non-volatile memory module; and storing the plurality of data temporarily in a buffer memory.

8. A memory controlling circuit unit for a rewritable non-volatile memory module, the memory controlling circuit unit comprising:

a host interface, configured to couple to a host system;

a memory interface, configured to couple to the rewritable non-volatile memory module, wherein the rewritable non-volatile memory module includes a plurality of physical erasing units, each of the plurality of physical erasing units includes a plurality of physical programming units; and a memory management circuit, coupled to the host interface and the memory interface, wherein the memory management circuit is configured to receive a plurality of data, wherein the memory management circuit is further configured to write the plurality of data into a first physical erasing unit of the plurality of physical erasing units by using a multi-page programming mode, wherein the memory management circuit is further configured to only write at least one first data among the plurality of data into a second physical erasing unit of the plurality of physical erasing units by using a single page programming mode, wherein the at least one first data is a part of the plurality of data, wherein the memory management circuit is further configured to only verify the at least one first data stored in the first physical erasing unit, if the verification fails, the memory management circuit is further configured to perform a writing operation to a third physical erasing unit of the plurality of physical erasing units by using the multi-page programming mode according to the at least one first data and the plurality of data.

9. The memory controlling circuit unit of claim 8, wherein a probability of occurring a write failure of at least one first physical programming unit for storing the at least one first data in the first physical erasing unit is higher than a probability of occurring the write failure of other physical programming units in the first physical erasing unit.

10. The memory controlling circuit unit of claim 9, wherein wherein the memory management circuit is further configured to verify data stored in the at least one first physical programming unit, if there is no uncorrectable bit in the data stored in the at least one first physical programming unit, the memory management circuit is further configured to mark at least one second physical programming unit for storing the first data in the second physical erasing unit as invalid, if there is an uncorrectable bit in a second data stored in the at least one first physical programming unit, the memory management circuit is further configured to perform the write operation to the third physical erasing unit by using the multi-page programming mode according to data stored in the other physical programming units in the first physical erasing unit and data stored in the at least one second physical programming unit in the second physical erasing unit.

11. The memory controlling circuit unit of claim 8, wherein the number of the at least one first data is thirty percent of the number of the plurality of data.

12. The memory controlling circuit unit of claim 9, wherein the rewritable non-volatile memory module comprises n word lines, the n word lines are arranged in an order, a plurality of memory cells on a same word line among the n word lines form one of the plurality of physical programming units, wherein a plurality of first memory cells of the plurality of memory cells form the first physical programming unit, the plurality of first memory cells are located on at least one first word line of the n word lines, and n is a positive integer greater than zero.

13. The memory controlling circuit unit of claim 12, wherein the at least one first word line is located at 0th to i-th word lines, j-th to k-th word lines or h-th to (n−1)th word lines of the n word lines, wherein i, j, k, and h are positive integers greater than zero respectively and are mutually discontinuous, wherein i is less than j, j is less than k, k is less than h, and h is less than n.

14. The memory controlling circuit unit of claim 8, wherein in the operation of receiving the plurality of data, the memory management circuit is further configured to receive at least one write command issued by a host system, wherein the write command is used to instruct the memory management circuit to write the plurality of data into the rewritable non-volatile memory module, the memory management circuit is further configured to store the plurality of data temporarily in a buffer memory.

15. A memory storage device, comprising:

a connection interface unit, configured to couple to a host system;

a rewritable non-volatile memory module, wherein the rewritable non-volatile memory module includes a plurality of physical erasing units, each of the plurality of physical erasing units includes a plurality of physical programming units; and a memory controlling circuit unit, coupled to the connection interface unit and the rewritable non-volatile memory module, wherein the memory controlling circuit unit is configured to receive a plurality of data, wherein the memory controlling circuit unit is further configured to write the plurality of data into a first physical erasing unit of the plurality of physical erasing units by using a multi-page programming mode, wherein the memory controlling circuit unit is further configured to only write at least one first data among the plurality of data into a second physical erasing unit of the plurality of physical erasing units by using a single page programming mode, wherein the at least one first data is a part of the plurality of data, wherein the memory controlling circuit unit is further configured to only verify the at least one first data stored in the first physical erasing unit, if the verification fails, the memory controlling circuit unit is further configured to perform a writing operation to a third physical erasing unit of the plurality of physical erasing units by using the multi-page programming mode according to the at least one first data and the plurality of data.

16. The memory storage device of claim 15, wherein a probability of occurring a write failure of at least one first physical programming unit for storing the at least one first data in the first physical erasing unit is higher than a probability of occurring the write failure of other physical programming units in the first physical erasing unit.

17. The memory storage device of claim 16, wherein the memory controlling circuit unit is further configured to verify data stored in the at least one first physical programming unit, if there is no uncorrectable bit in the data stored in the at least one first physical programming unit, the memory controlling circuit unit is further configured to mark at least one second physical programming unit for storing the first data in the second physical erasing unit as invalid, if there is an uncorrectable bit in a second data stored in the at least one first physical programming unit, the memory controlling circuit unit is further configured to perform the write operation to the third physical erasing unit by using the multi-page programming mode according to data stored in the other physical programming units in the first physical erasing unit and data stored in the at least one second physical programming unit in the second physical erasing unit.

18. The memory storage device of claim 15, wherein the number of the at least one first data is thirty percent of the number of the plurality of data.

19. The memory storage device of claim 16, wherein the rewritable non-volatile memory module comprises n word lines, the n word lines are arranged in an order, a plurality of memory cells on a same word line among the n word lines form one of the plurality of physical programming units, wherein a plurality of first memory cells of the plurality of memory cells form the first physical programming unit, the plurality of first memory cells are located on at least one first word line of the n word lines, and n is a positive integer greater than zero.

20. The memory storage device of claim 19, wherein the at least one first word line is located at 0th to i-th word lines, j-th to k-th word lines or h-th to (n−1)th word lines of the n word lines, wherein i, j, k, and h are positive integers greater than zero respectively and are mutually discontinuous, wherein i is less than j, j is less than k, k is less than h, and h is less than n.

21. The memory storage device of claim 15, wherein in the operation of receiving the plurality of data, the memory controlling circuit unit is further configured to receive at least one write command issued by a host system, wherein the write command is used to instruct a memory management circuit to write the plurality of data into the rewritable non-volatile memory module, the memory controlling circuit unit is further configured to store the plurality of data temporarily in a buffer memory.

* * * * *